United States Patent
Bonnell et al.

(10) Patent No.: US 9,683,855 B2
(45) Date of Patent: Jun. 20, 2017

(54) METHODS AND SYSTEMS FOR CREATING AND USING A LOCATION IDENTIFICATION GRID

(71) Applicant: United States Postal Service, Washington, DC (US)

(72) Inventors: Clayton C. Bonnell, Fairfax, VA (US); Neri G. Terry, Jr., Springfield, VA (US); Kurt J. Schulz, Ballwin, MO (US)

(73) Assignee: United States Postal Service, Washington, DC (US)

( * ) Notice: Subject to any disclaimer, the term of this patent is extended or adjusted under 35 U.S.C. 154(b) by 0 days.

(21) Appl. No.: 14/848,120

(22) Filed: Sep. 8, 2015

(65) Prior Publication Data

US 2015/0377645 A1    Dec. 31, 2015

Related U.S. Application Data

(62) Division of application No. 13/607,324, filed on Sep. 7, 2012, now Pat. No. 9,222,777.

(51) Int. Cl.
| | |
|---|---|
| *G01C 21/30* | (2006.01) |
| *G01C 21/32* | (2006.01) |
| *G01C 21/34* | (2006.01) |
| *G01C 21/00* | (2006.01) |
| *G06Q 10/10* | (2012.01) |
| *G09B 29/00* | (2006.01) |

(Continued)

(52) U.S. Cl.
CPC ............. *G01C 21/34* (2013.01); *G01C 21/00* (2013.01); *G01C 21/20* (2013.01); *G01C 21/3667* (2013.01); *G06Q 10/10* (2013.01); *G09B 29/007* (2013.01)

(58) Field of Classification Search
CPC .... G01C 21/34; G01C 21/20; G01C 21/3667; G06Q 10/10; G09B 29/007
USPC ............... 701/408, 409, 412, 430, 445, 454; 434/153
See application file for complete search history.

(56) References Cited

U.S. PATENT DOCUMENTS

| | | |
|---|---|---|
| 5,445,524 A | 8/1995 | Jones |
| 5,737,731 A * | 4/1998 | Lester ................... H04W 64/00 455/40 |
| 5,848,373 A | 12/1998 | DeLorme et al. |

(Continued)

*Primary Examiner* — Jaime Figueroa
(74) *Attorney, Agent, or Firm* — Knobbe Martens Olson & Bear LLP

(57) ABSTRACT

A method and system for generating a location identification grid and for using a location identification grid. The location identification grid can include a first geographic area that correspond to a pre-existing area. This pre-existing area can correspond to a postal code such as a zip code, a telephone code such as, an area code, or any other desired pre-existing area. The location identification grid can be subdivided into smaller geographic areas to allow more accurate identification of a location. The location identification grid can include a second geographic area. The second geographic area can be a subdivision of the first geographic area. The location identification grid can be used with signals that identify a location within a location identification grid. These signals can include a first component corresponding to the first geographic area and the second component corresponding to one or more second geographic areas.

20 Claims, 9 Drawing Sheets

(51) Int. Cl.
*G01C 21/20* (2006.01)
*G01C 21/36* (2006.01)

(56) References Cited

U.S. PATENT DOCUMENTS

| | | | | |
|---|---|---|---|---|
| 6,047,236 | A * | 4/2000 | Hancock | G01C 21/20 |
| | | | | 342/357.41 |
| 6,295,502 | B1 | 9/2001 | Hancock et al. | |
| 6,442,483 | B1 | 8/2002 | Doglione | |
| 6,597,983 | B2 * | 7/2003 | Hancock | G01C 21/20 |
| | | | | 701/300 |
| 6,609,062 | B2 | 8/2003 | Hancock | |
| 7,065,886 | B2 | 6/2006 | Ségur | |
| 8,589,069 | B1 * | 11/2013 | Lehman | G01C 21/20 |
| | | | | 340/995.1 |
| 8,935,220 | B2 * | 1/2015 | Hancock | G01C 21/20 |
| | | | | 707/640 |
| 9,097,527 | B2 * | 8/2015 | Notstrand | G01C 11/00 |
| 2004/0215480 | A1 | 10/2004 | Kadaba | |
| 2005/0107948 | A1 * | 5/2005 | Catalinotto | G01C 21/00 |
| | | | | 701/409 |
| 2014/0095497 | A1 | 4/2014 | Howe | |
| 2014/0172739 | A1 | 6/2014 | Anderson | |
| 2015/0088713 | A1 | 3/2015 | Votaw et al. | |
| 2015/0278758 | A1 | 10/2015 | Kim et al. | |

* cited by examiner

METHODS AND SYSTEMS FOR CREATING AND USING A LOCATION IDENTIFICATION GRID

CROSS-REFERENCE TO RELATED APPLICATIONS

This application is a divisional of U.S. patent application Ser. No. 13/607,324, filed Sep. 7, 2012 the entire contents of which are hereby incorporated in its entirety.

BACKGROUND

Field of the Invention

This application relates to the field of geographic location identification.

Description of the Related Art

Location identification is done in a number of ways including, for example, relative location, addressing, and through the use of grid systems.

Determining relative location is a long used method of developing location identification. Relative location is with reference to landmarks or other identifying features. While relative location is simple, it is difficult to reliably use, as landmarks may be difficult to consistently identify. Relative location is also difficult to use because the landmarks and other identifying features can change over time. Thus, while relative location is useful in facilitating location identification, it also has drawbacks.

Addressing is another method of location identification. Addressing can be performed by, for example, identifying a street and a location on the street. In many instances of addressing, the location on the street is associated with buildings or properties located on the street. While addressing provides a more reliable form of location identification, it also has several difficulties. Addressing can be a very inefficient form of location identification for a person who is unfamiliar with an area or with a street. For example, a person may not be able to find the street referenced in an address. Further, addressing isn't intuitive, in that the name and location of one street is usually not indicative of the name or location of another street. Thus, a person must be familiar with the area in which the address is located in order to know how to use addressing to find a location. Further, as addressing relies on relative positioning on a street, and as the relative position is usually defined relative to property or structures, changes in property, changes to the structures on the street, and/or changes in the street itself can make the addressing system difficult to use. Another shortcoming of addressing is that an addressing system does not accurately identify locations within properties or other locations not associated with the property.

The association of a grid-type system with the land area is another method of location identification. Such systems include, for example, latitude and longitude on the globe, and the national grid system. While grid systems allow accurate identification of a location, and while the identification of the location is independent of physical landmarks or physical identifying features, a grid system also has shortcomings. One of the greatest shortcomings of a grid system is that it is separated from daily experience. Thus, a person using a grid system does not usually experience locations in terms of the grid system, but rather in terms of addresses and relative locations. Thus, complete reliance on a grid system can cause problems for a new user. Further, grid systems frequently identify a point and do not identify an area.

In light of these shortcomings, a new method and system of location identification is required to facilitate intuitive and accurate location identification.

SUMMARY OF THE INVENTION

Some embodiments relate to system for creating a location identification grid. In some embodiments, the system can include, memory having information relating to first irregularly shaped geographic areas that divide a representation of a geographic region and a processor that can receive a user request for location information, query the memory for information relating the first irregularly shaped geographic areas, determine the first irregularly shaped geographic area containing the requested location, divide a representation of the first geographic area containing the requested location into a plurality of first regions with a plurality of first parallel lines and with a plurality of second parallel lines, which first parallel lines intersect the second parallel lines and thereby define a plurality of second geographic areas, determine from among the plurality of second geographic areas the second geographic area containing the requested location, and output location information relating to the requested location and the second geographic area.

In some embodiments of the system for creating a location identification grid, the plurality of first irregularly shaped geographic areas can correspond to pre-existing areas such as, for example, zip codes, postal codes, and/or area codes. In some embodiments of the system for creating a location identification grid, the plurality of first parallel lines and the plurality of second parallel lines correspond to pre-existing grid lines such as, for example, the national grid. In some embodiments of the system for creating a location identification grid, the plurality of second geographic areas correspond to pre-existing areas such as, for example, the national grid.

In some embodiments of the system for creating a location identification grid, the second geographic areas are rectangular shaped, and in some embodiments of the system for creating a location identification grid the second geographic areas are square. In some embodiments of the system for creating a location identification grid, the first parallel lines are perpendicular to the second parallel lines.

In some embodiments of the system for creating a location identification grid, the memory can further include a unique identifier associated with one of the first irregularly shaped geographic areas such as, for example, a pre-existing identifier. In some embodiments of the system for creating a location identification grid, the processor can further determine whether further resolution of the location identification is required and/or to sub-divide the second geographic areas.

Some embodiments relate to a system for defining a geographic location that includes, memory storing information relating to a plurality of non-uniformly shaped areas, which one of the non-uniformly shaped areas corresponds to a pre-existing area and a processor that receives a user request for information relating to a first location, receives information from a user relating to a second location, identifies the first location by querying the memory for information relating to one of the non-uniformly shaped areas, which memory is queried with a pre-existing identifier received in the user request and identifying one of the non-uniformly shaped areas, which one of the non-uniformly shaped areas includes the first location, sub-divides the one of the non-uniformly shaped areas with a rectangular coordinate system, determines the sub-division of the non-uniformly shaped area including the first location, and provides the user location information for the first location relative to the second location.

In some embodiments of the system for defining a geographic location, the plurality of non-uniformly shaped areas can correspond to pre-existing areas such as, for example, areas defined by a postal codes and/or zip codes. In some embodiments of the system for defining a geographic location, the rectangular coordinate system is a pre-existing rectangular coordinate system such as, for example, the national grid. In some embodiments of the system for defining a geographic location, the processor can further determine whether further resolution of the location identification is required. In some embodiments of the system for defining a geographic location, the processor can sub-divide the sub-areas.

Some embodiments relate to a system for providing location information. The system can include a user communication interface, a memory having location information, and a processor that can receive a user location request including an identifier of a first location having a first component and a second component, which first component of the identifier corresponds to a first geographic area, and which second component of the identifier corresponds to second geographic area which is a portion of the first geographic area, that can query the database for location information corresponding to the first component of the identifier, that can identify the first geographic area, that can query the database for location information corresponding to the second part of the identifier, and that can identify the second geographic area.

In some embodiments of the system for providing location information, the first geographic area corresponds to a pre-existing area, which pre-existing area can correspond to the area defined by a postal code, a zip code, and/or an area code. In some embodiments of the system for providing location information, the pre-existing area can be irregularly shaped. In some embodiments of the system for providing location information, the second geographic area can have pre-existing boundaries, which can be, for example, defined by the national grid. In some embodiments of the system for providing location information, the second geographic area can include a portion of the first geographic area.

In some embodiments of the system for providing location information, a plurality of second geographic areas define the entire first geographic area. In some embodiments of the system for providing location information, the second geographic area identifies the first location.

In some embodiments of the system for providing location information, the processor can further receive an indication of a second location, and in some embodiments of the system for providing location information, the processor can provide directions instructing how to move from the second location to the first location.

In some embodiments of the system for providing location information, a portion of the second component of the identifier further corresponds to third geographic area which is a portion of the second geographic area. In some embodiments of the system for providing location information, the processor can identify the second geographic area based on the portion of the second component of the identifier corresponding to the third geographic area.

In some embodiments of the system for providing location information, the memory can include security information, and in some embodiments of the system for providing location information, the processor can query the memory for security information and can determine whether the user location request complies with the security information.

Some embodiments relate to a method of directing a person to a location. The method can include receiving a request for location information at a processor, which request can include an indication of a desired destination, querying a memory with the processor to determine from a group of first irregularly shaped geographic areas a first irregularly shaped geographic area including the desired destination, querying the memory with the processor to determine from a group of second geographic areas covering the first irregularly shaped geographic area including the destination a second geographic area including the desired destination, determining a present location, and providing an audible or visual output indicating a path to reach the desired destination.

In some embodiments of the method of directing a person to a location, the first irregularly shaped geographic areas can correspond to pre-existing geographic areas such as, for example, areas designated by one or several postal codes and/or areas designated by one or several area codes. In some embodiments of the system for providing location information, the second geographic areas correspond to pre-existing geographic areas such as, for example, areas defined by an existing polar coordinate system and/or areas defined by an existing Cartesian grid system.

In some embodiments of the system for providing location information, receiving a request for location information includes receiving a user input identifying a desired destination. In some embodiments of the system for providing location information, receiving a request for location information includes receiving a third party input identifying a desired destination, which third party input can include, for example, receiving an input from a webpage. In some embodiments of the system for providing location information, the path to reach the desired destination is partially on a road.

Some embodiments relate to a system for directing a person to a location. The system can include means for receiving a request for location information, which request includes an indication of a desired destination, means for identifying from a group of first irregularly shaped geographic areas a first irregularly shaped geographic area including the desired destination, means for identifying from a group of second geographic areas covering the first irregularly shaped geographic area including the destination a second geographic area including the desired destination, means for determining a present location, and means for providing an audible or visual output indicating a path to reach the desired destination.

Some embodiments relate to a system for creating a location identification grid. The system can include, for example, means for storing information relating to first irregularly shaped geographic areas that divide a representation of a geographic region, means for receiving a user request for location information, means for identifying information relating to the first irregularly shaped geographic areas, means for determining a first irregularly shaped geographic area containing the requested location, means for dividing a representation of the first geographic area containing the requested location into a plurality of first regions with a plurality of first parallel lines and with a plurality of second parallel lines, which first parallel lines intersect the second parallel line and thereby define a plurality of second geographic areas, means for determining the second geographic area containing the requested location, and means for outputting location information relating to the requested location and the second geographic area.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

DETAILED DESCRIPTION OF THE PREFERRED EMBODIMENT

Figure 1:
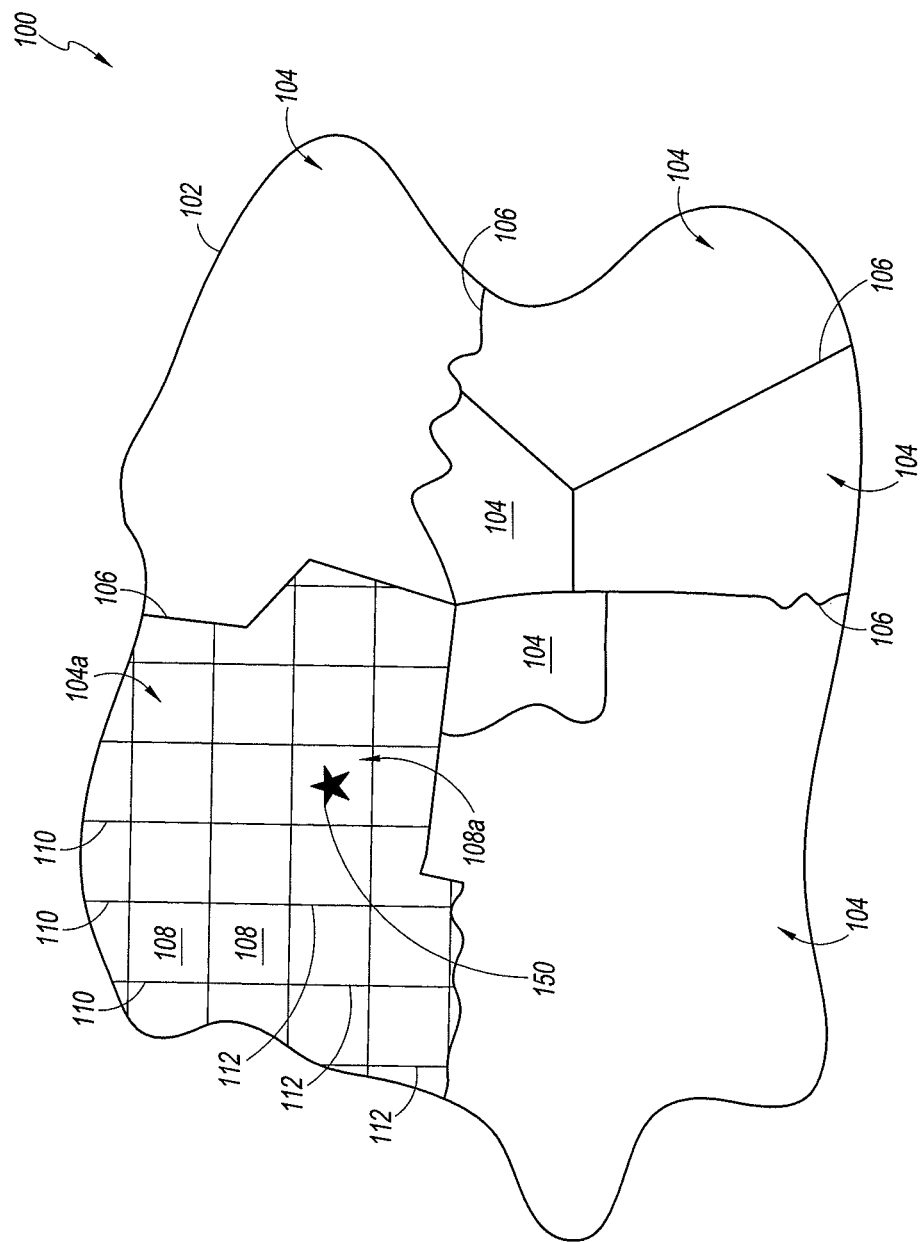
FIG. 1 is an illustration of one embodiment of a location identification grid covering a geographic region.

Some embodiments described herein relate to systems and methods for generating a location identification grid. Some embodiments relate specifically to methods of creation of the location identification grid. Some embodiments relate to methods for using the location identification grid. Some embodiments relate to new techniques and methods for identifying a location within a location identification grid. Some embodiments relate to hardware and software components that can be used in connection with the location identification grid.

In some embodiments, a geographic region can be divided into a number of smaller geographic areas. In some embodiments, each of these geographic areas can be further divided until a desired level of resolution within the grid is achieved. In some embodiments, a location can be identified by identifying one or several areas containing the location. In some embodiments, the division of these geographic areas can be divided by applying an existing grid system such as, for example, a regular grid, a Cartesian grid, rectilinear grid, a curvilinear grid, and/or polar grid system to these geographic areas. In some embodiments, this grid system can include, for example, the national grid.

The location identification grid can be used to identify locations within a geographic region. The geographic region can be divided into a plurality of first geographic areas. In some embodiments, these first geographic areas can cover the entirety of the geographic region. These geographic areas can be, for example, regularly shaped or irregularly shaped. In some embodiments, these first geographic areas can be the same size, can have different sizes, or can fall within a consistent range of sizes. In some embodiments, these first geographic areas can, for example, correspond to preexisting divisions of the geographic region.

In some embodiments of the location identification grid, each of the first geographic areas can be divided into a plurality of second geographic areas. In some embodiments, the division of the first geographic areas into a plurality of second geographic areas can be done by applying a pre-existing grid such as, for example, a regular grid, a Cartesian grid, rectilinear grid, a curvilinear grid, and/or polar grid system, to the first geographic areas, and in some embodiments, the division of the first geographic areas into a plurality of second geographic areas can be done by creating a new grid system within the first geographic areas.

In some embodiments, the plurality of second geographic areas can cover the entirety of the first geographic areas. In some embodiments, for example, the first geographic areas can be divided into second geographic areas of a first size. Thus, in this embodiment, the second geographic areas of a first size have the same size. In some embodiments, the second geographic areas of a first size can also have the same shape. However, and in light of the fact that the first geographic areas can be irregularly shaped, and can have different sizes, the plurality of first geographic areas may have different numbers of second geographic areas of a first size within the boundaries of each of the first geographic areas, and the second geographic areas of a first size can be different sizes and shapes.

In some embodiments, each of the second geographic areas of a first size can be further divided into second geographic areas of a second size. In some embodiments, the division of the second geographic areas of a first size into a plurality of second geographic areas of a second size can be done by applying a pre-existing grid such as, for example, a regular grid, a Cartesian grid, rectilinear grid, a curvilinear grid, and/or polar grid to the first geographic areas, and in some embodiments, the division of the second geographic areas of a first size into a plurality of second geographic areas of a second size can be done by creating a new grid system within the second geographic areas of a first size. In some embodiments, for example, the second geographic areas of a second size can cover the entirety of each of the second geographic areas of a first size. In some embodiments, the second geographic areas of a second size can have the same shape and/or the same size.

In some embodiments, each of the second geographic areas of the second size can be further divided into smaller groups, similar to the division of the second geographic areas of the first size. This division can be achieved by using similar steps and methods to those outlined above. This process can be continued for each new second geographic area until a desired level of resolution and accuracy has been achieved.

By dividing the geographic region into a number of first geographic areas, a location can be identified based on its existence within the boundaries of one of the first geographic areas. Similarly, by dividing each of the first geographic areas into a plurality of second geographic areas of a first size, a location can be identified by reference to its location within the boundaries of a first geographic area and to its location within the boundaries of a second geographic area of a first size. The identification of a location can be continuously more specifically indicated by identifying a location based on its existence within the boundaries of progressively smaller second geographic areas. Location identification by identifying continuously smaller geographic areas containing the desired location within the boundaries can be performed until the desired level of accuracy in the location identification has been achieved.

A variety of systems and modules can be used in connection with the location identification grid. Similarly, a variety of systems and modules can be used in connection with the process for identifying a location by reference to a location identification grid. In some embodiments, for example, a system for use in connection with a location identification grid or for use in generating a location identification grid can comprise a variety of components and/or modules. These components and/or modules can be, for example, hardware or software. In some embodiments, these modules can be independent devices or can be functioning within a single device. In some embodiments, these modules and/or components can communicate with each other. These modules can include, for example, a processor, memory, a communications module, a security module, and an administrator's module.

In some embodiments, modules of a system for use with a location identification grid or for use in generating a location identification grid can communicate with a user. In some embodiments, these modules can communicate with a user via an interface, or via a user device. In some embodiments, for example, these modules can receive inputs from a user. In some embodiments, these modules can provide outputs and/or prompts to a user.

A person of skill in the art will recognize that a variety of components, devices, modules, and/or other features can be used in the creation of a system for generation of a location identification grid or for use in connection with the location identification grid, and that the present disclosure is not limited to any specific system or to any specific modules, components, and/or any other features.

A location identification grid can be generated in a variety of ways. In one embodiment of generating a location identification grid, a geographic region can be identified. This geographic region can be divided into a series of progressively smaller geographic areas. Specifically, this geographic region can be divided into first geographic areas, which first geographic areas cover the entirety of the geographic region. Each of these first geographic areas can be divided into a plurality of second geographic areas of a first size. Similarly, the second geographic areas of a first size can be divided into second geographic areas of a second size, which second geographic areas of a second size can likewise be subdivided into smaller second geographic areas. This process of division of the continually smaller second geographic areas can be performed until the desired accuracy and resolution of the location identification grid is achieved. As discussed above, this division can be achieved by applying a pre-existing system to the first geographic areas, such as, for example, the national grid.

In some embodiments, smaller "child" geographic areas can be created from larger "parent" geographic areas. In some embodiments, the second geographic areas can be created by dividing the parent area in which they are located with a plurality of parallel first lines. These first lines can, in some embodiments, extend from one side of the parent geographic area to another side of a parent geographic area. In some embodiments, the parent geographic area can be further divided. In some embodiments, these second lines can extend from one side of the parent geographic area to the other side of the parent geographic area. In some embodiments, the second lines can be, for example, perpendicular to the first lines. The creation of second, child geographic areas by a plurality of parallel first lines and a plurality of parallel second lines, which parallel second lines are perpendicular to the parallel first lines, can result in the creation of a number of rectangularly shaped second geographic areas.

In some embodiments, information relating to the first geographic areas and/or the second geographic areas can be stored in a database.

In some embodiments, a location identification grid can be used in a variety of ways to assist in the identification of a location and to assist in the performance of a variety of tasks. In some embodiments in which a location identification grid is used to facilitate the identification of a location, a signal can be received from a user. In some embodiments, this signal can include a request for the identification of a location. In some embodiments, this request can include a text stream. This text stream can be divided into components, which components identify the relevant first geographic area and any relevant second geographic area or areas. In some embodiments, these components can be used to determine a location. After the location has been identified and/or determined, information relating to the location can be provided to the user.

A person of skill in the art will recognize that the location identification grid can be used in the performance of a variety of tasks, and that the present application is not limited to the details of the above-disclosed method of using a location identification grid.

Location Identification Grid

FIG. 1 depicts one embodiment of a location identification grid 100. As seen in FIG. 1, the location identification grid 100 covers a geographic region 102. The geographic region 102 can comprise a variety of sizes and shapes, and can have any desired size and shape and can include any desired geographic features, such as, for example, cities, mountains, plains, rivers, valleys, or any other geographic feature. The geographic region 102 can have a variety of boundaries. In some embodiments, the geographic region 102 can have preexisting boundaries, such as boundaries formed by a coastline, a river line, or any other natural or manmade or preexisting feature. In some embodiments, the geographic region 102 can have political boundaries that can include, for example, state boundaries, country boundaries, city boundaries, county boundaries, or any other politically determined boundary. In some embodiments, the geographic region can be a continent such as North America, a country such as the United States, or a state such as Virginia.

The geographic region 102 can comprise a plurality of first geographic areas 104. As seen in FIG. 1, each of the geographic areas 104 can include a portion of the geographic region 102. Further, the sum of the plurality of first geographic areas 104 can, for example, encompass the entire area of the geographic region 102. Thus, the entire area of the geographic region 102 can be, as depicted in FIG. 1 included in the first geographic areas 104.

The first geographic areas 104 can comprise a variety of shapes and sizes. In some embodiments, the first geographic areas 104 can comprise the same shapes and sizes. In some embodiments, the first geographic areas 104 can comprise different sizes and/or different shapes.

In some embodiments, a first geographic area 104 can comprise a regular geometric shape such as, for example, a circle, a triangle, a rectangle, a quadrilateral, a polygon, a hexagon, a pentagon, or any other desired regular geometric shape. In some embodiments, the first geographic area 104 can comprise an irregular shape. In some embodiments, the first geographic areas 104 can comprise a variety of sizes.

In some embodiments, the first geographic areas 104 can comprise, for example, a group of preexisting areas. These areas can be related to postal systems such as, for example, areas associated with a zip code, related to telecommunications systems such as, for example, areas associated with an area code, related to political divisions such as, for example, state, county, city, country, or other political region or boundary, or can be related to any other service or purpose. In some embodiments, the first geographic areas 104 can be created solely to function within the location identification grid 100.

Each of the first geographic areas 104 can be defined by first boundaries 106. These first boundaries 106 can, for example, coincide with a portion of one or more of the boundaries of the geographic region 102, or can be independent of the boundaries of the geographic region 102. In some embodiments, these boundaries 106 correspond to natural boundaries, political boundaries, or any other boundaries. Thus, in some embodiments, the boundaries 106 correspond to preexisting dividing features including, for example, rivers, shores, streets, highways, state boundaries, county boundaries, national boundaries, city boundaries, or any other boundary.

As further seen in FIG. 1, the first geographic areas 104 can be subdivided into a plurality of second geographic areas of a first size 108. The second geographic areas of a first size 108 can comprise a variety of shapes and sizes. In some embodiments, the second geographic areas of a first size 108 can comprise the same shape and size. In some embodiments, the second geographic areas of a first size 108 can comprise different shapes and sizes. In some embodiments, the second geographic areas of a first size 108 can be regularly shaped or irregularly shaped. As depicted in FIG. 1, in some embodiments, the second geographic areas of a first size 108 can comprise a plurality of rectangles of the same size, or a plurality of squares of the same size. In some embodiments, the second geographic areas of a first size 108 can comprise a range of sizes.

In some embodiments, and as seen in FIG. 1, the entirety of the area of some or all of the first geographic areas 104 can be covered by second geographic areas of a first size 108. Thus, and as seen in FIG. 1, each portion of the first geographic area 104 can be included in one of a plurality of second geographic areas of a first size 108.

To provide different levels of accuracy in location identification, a first geographic area 104 can be divided into any number of second geographic areas of a first size 108. In some embodiments, the first geographic area 104 can be divided into second geographic areas of a first size 108 by one or several first boundary lines 110, and one or several second boundary lines 112. In some embodiments, these boundary lines 110, 112 can correspond to a pre-existing grid system, such as, for example, the boundaries of the national grid.

In some embodiments, the first boundary lines 110 can be linear or nonlinear. Similarly, in some embodiments, the second boundary lines 112 can be linear or nonlinear. In some embodiments, the first boundary lines 110 and the second boundary lines 112 can coincide with the preexisting boundaries or natural boundaries such as, for example, boundaries defined by a river, mountains, shoreline, a political boundary such as a state, a county, a city, or a national boundary, or any other manmade or natural boundary.

In some embodiments, the first boundary lines 110 can comprise a plurality of parallel linear boundaries. In some embodiments, the second boundary lines 112 can likewise comprise a plurality of parallel linear boundary lines. In some embodiments, the second boundary lines 112 can be perpendicular to the first boundary lines 110. In some embodiments, the first boundary lines 110 and the second boundary lines 112 can define a grid.

The number of first boundary lines 110 and second boundary lines 112 can be the same in each of the first geographic areas 104. In some embodiments, the number of first boundary lines 110 and the number of second boundary lines 112 can vary between first geographic areas 104. In some embodiments, the spacing between the first boundary lines 110 and between the second boundary lines 112 can be constant inside a single first geographic area and between first geographic areas 104. Thus, in some embodiments in which the spacing between the first boundary lines 110 and the second boundary lines 112 is constant between first geographic areas 104, the second geographic areas of a first size 108 defined by first and second boundary lines 110 and 112, can be, in part, the same size. In some embodiments, in which the first geographic area 104 is irregularly shaped, second geographic areas of a first size 108 having a boundary that coincides with the first boundaries 106 may not have the same shape as other second geographic areas of a first size 108, or cover the same area as other second geographic areas of a first size 108.

As the geographic region 102 is subdivided into first geographic areas 104, and as the first geographic areas 104 are subdivided into second geographic areas of a first size 108, the specification of a first geographic area 104 identifies a portion of the geographic region 102 and thereby more accurately identifies a location than merely identifying the geographic region 102. Similarly, the specification of a second geographic area of a first size 108 within a first geographic area 104 identifies a portion of the first geographic area 104 and thereby more accurately identifies a location than merely identifying the first geographic area 104.

Figure 2:
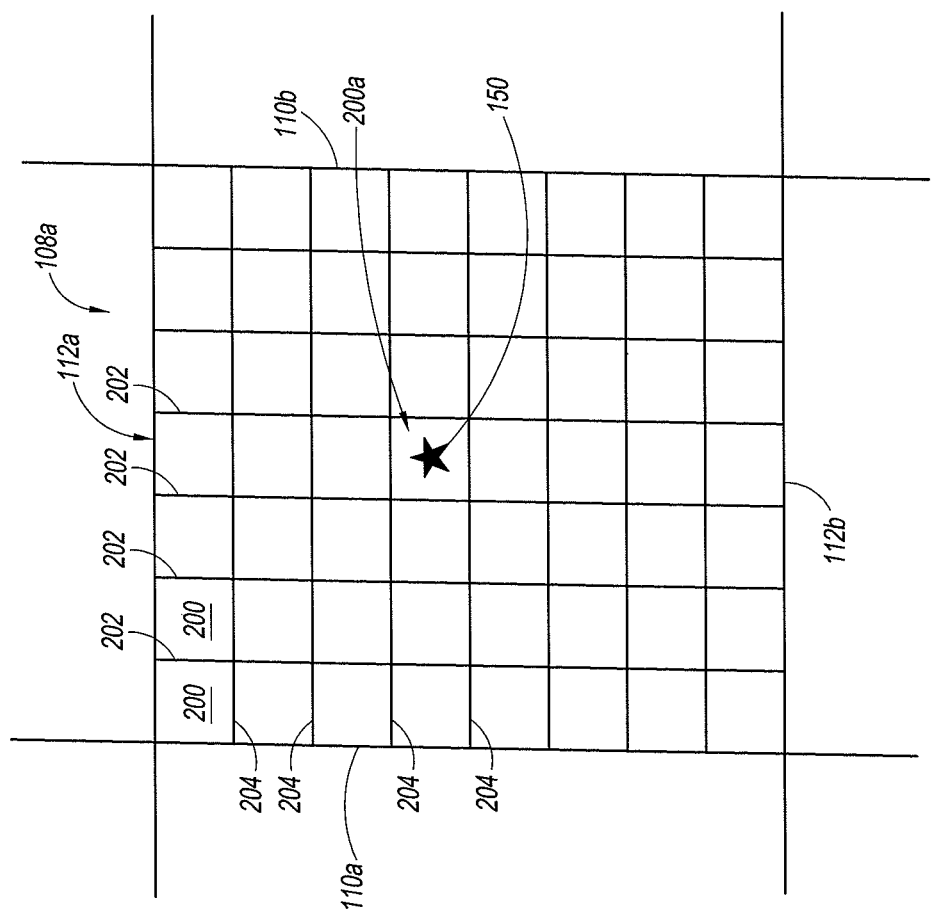
FIG. 2 is an illustration of a close-up section of one portion of the location identification grid shown in FIG. 1.

FIG. 2 shows a close-up of one of the second geographic areas 108 depicted in FIG. 1. As seen in FIG. 2, the second geographic area of a first size 108 is defined by a plurality of boundaries. Specifically, the second geographic area of a first size 108 is defined by a left first boundary line 110a, a right first boundary line 110b, a top second boundary line 112a, and a bottom second boundary line 112b. As discussed above, and as shown in FIG. 2, the first boundary lines 110a and 110b can be parallel. Similarly, and as discussed above, the second boundary lines 112a and 112b can be parallel, and can be perpendicular to the first boundary lines 110a, 110b. Due to the orientation of the first boundary lines 110a, 110b and the second boundary lines 112a, 112b, the intersection of the first boundary lines 110a, 110b and the second boundary lines 112a, 112b defines a rectangular, and as depicted in FIG. 2, a square second geographic area of a first size 108. As seen in FIG. 2, the second geographic area of a first size 108 can be further subdivided into second geographic areas of a second size 200. In some embodiments, these second geographic areas of a second size 200 can correspond to areas defined by a pre-existing grid system, such as, for example, the boundaries of the national grid.

The second geographic areas of a second size 200 can comprise a variety of shapes and sizes. In some embodiments, the second geographic areas of a second size 200 can be the same shape and size. In some embodiments, the second geographic areas of a second size 200 can be different shapes and sizes. In some embodiments, the second geographic areas of a second size 200 can be regularly shaped or irregularly shaped.

In some embodiments, the second geographic areas of a second size 200 can have any desired area that is smaller than the area of the second geographic areas of a first size 108.

In some embodiments, the sum of the plurality of the second geographic areas of a second size 200 can include all of the area of the second geographic area of a first size 108. Thus, in some embodiments, each portion of the second geographic area of a first size 108 is included in a portion of one of the second geographic areas of a second size 200.

In some embodiments, the second geographic area of a first size 108 can be subdivided into second geographic areas of a second size 200 by one or several third boundary lines 202 and one or several fourth boundary lines 204. In some embodiments, these boundary lines 202, 204 can correspond to a pre-existing grid system, such as, for example, the boundaries of the national grid. In some embodiments, the third boundary lines 202 can comprise one or several parallel boundary lines. In some embodiments, these boundary lines can be linear or nonlinear. Similarly, in some embodiments, the fourth boundary lines 204 can comprise one or several parallel lines. In some embodiments, the fourth boundary lines 204 can be linear or nonlinear. In some embodiments, both the third boundary lines 202 and the fourth boundary lines 204 can correlate to preexisting boundaries, or can be created for the purpose of subdividing the second geographic area of the first size 108.

The boundary lines 202, 204 can be regularly spaced or irregularly spaced. In some embodiments, the third boundary lines 202 are perpendicular to the fourth boundary lines 204. In some embodiments, in which the third boundary lines 202 are parallel, and are perpendicular to the fourth boundary lines 204, the combination of the third boundary lines 202 and the fourth boundary lines 204 defines a grid.

The division of the second geographic area of a first size 108 into a plurality of second geographic areas of a second size 200 allows a more accurate identification of a location, as the existence of second geographic areas of a second size 200 within the second geographic area of a first size 108 allows the specification of a portion of the second geographic area of a first size 108 including a specific location.

While FIGS. 1 and 2 only depict dividing a geographic region 102 into a first geographic area 104, and dividing the first geographic area 104 into a second geographic area of a first size 108, which second geographic area of a first size 108 is subdivided into a second geographic area of a second size 200, a person of skill in the art will recognize that the second geographic area of a second size 200 can be further subdivided into smaller second geographic areas of a third size, which second geographic areas of a third size can likewise be subdivided into smaller second geographic areas of a fourth size, which subdivision can continue until a desired level of accuracy within the location identification grid 100 has been achieved.

Text Strings Identifying a Location

In some embodiments, the geographic areas of a geographic region 102 can be uniquely identified. In some embodiments, for example, each of the first geographic areas 104 can be assigned a unique identifier, such as, for example, a unique text string. In some embodiments, this unique text string can comprise a unique identifying number.

In some embodiments, a second geographic area can be uniquely identified by identifying the first geographic area containing the second geographic area and identifying the second geographic area relative to the first geographic area.

By way of example, and referring to FIG. 1, the first geographic area 104 containing location 150, unique first geographic area 104*a*, can be assigned a unique identifier. As shown in FIG. 1, the geographic region 102 includes seven first geographic areas 104, including unique first geographic area 104*a*. In one embodiment, each of these seven first geographic areas 104 could be uniquely identified by assignment of a unique number. In one embodiment, each of these seven first geographic areas can be assigned a number between one and seven, and unique first geographic area 104*a* can be assigned, for example, the number one.

Further, the second geographic area of a first size 108 containing location 150, unique second geographic area of a first size 108*a*, can be identified. In some embodiments, this identification can be achieved by assigning a unique identifier to each of the second geographic areas of a first size 108. In some embodiments, this unique identifier can include information identifying the first geographic area 104 that includes the second geographic area of a first size 108, and that identifies one of the second geographic area of a first size 108 located with the first geographic area 104. In the embodiment depicted in FIG. 1, in which the first geographic area 104 can be divided into eight columns of second geographic areas of a first size 108 and six rows of second geographic areas of a first size 108, a second geographic area of a first size 108 can be identified within the unique first geographic area 104*a* by identifying its column and row location.

Thus, the unique second geographic area of a first size 108*a*, which is located in the fifth column from the leftmost boundary of the unique first geographic area 104*a*, and in the third row from the bottommost boundary of the unique first geographic area 104*a*, can be identified within the unique first geographic area 104*a* with "53," which corresponds to the location in the fifth column and the third row. Thus, the unique second geographic area of a first size 108*a* can be uniquely identified by reference to its location within unique first geographic area 104*a* and its row column location within the unique first geographic area 104*a*. This identification can be, for example, "153."

As shown in FIG. 2, in some embodiments, the location 150 can be further identified by specifying a unique second geographic area of a second size 200*a* containing the location 150. Like the second geographic area of a first size 108, the location of the unique second geographic area of a second size 200*a* can be uniquely identified by identifying the unique first geographic area 104*a* containing the location 150, by identifying the unique second geographic area of a first size 108*a* containing the location 150 relative to the unique first geographic area 104*a*, and by identifying the unique second geographic area of a second size 200*a* containing the location 150 relative to the unique second geographic area of a first size 108*a*. In the embodiment depicted in FIG. 2, in which the second geographic area of a first size 108 found in unique first geographic area 104*a* can be divided into seven columns and eight rows, a second geographic area of a second size 200 can be identified within the unique second geographic area of a first size 108*a* by identifying its column and row location.

Thus, the unique second geographic area of a second size 200*a*, which is located in the fourth column from the leftmost boundary of the unique second geographic area of a first size 108*a*, and in the fifth row from the bottommost boundary of the unique second geographic area of a first size 108*a*, can be identified within the unique second geographic area of a first size 108*a* with "45," which corresponds to the location in the fourth column and the fifth row. Thus, the unique second geographic area of a second size 200*a* can be uniquely identified by reference to the unique first geographic area 104*a* containing the unique second geographic area of a second size 200*a*, by reference to the unique second geographic area of a first size 108*a* containing the unique second geographic area of a second size 200*a*, and by reference to its row/column location within the unique second geographic area of a first size 108*a*. This identification can be, for example, "15345."

Figure 3A:
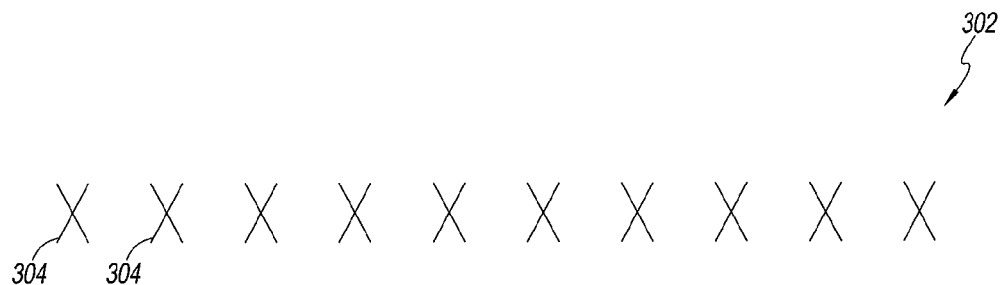
FIGS. 3A-3C are representations of text strings that can be used to indicate a location in the location identification grid.
Figure 3B:
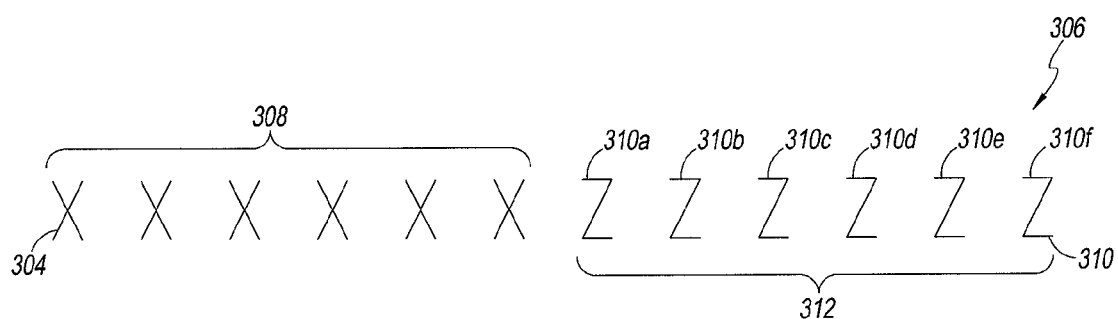
Figure 3C:
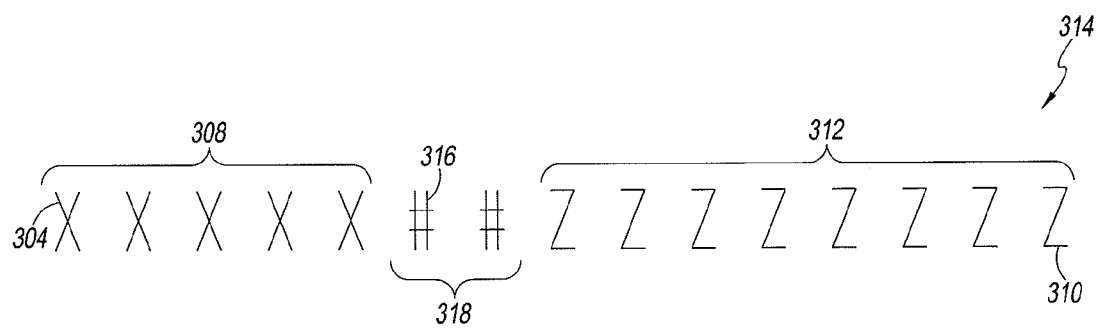

FIGS. 3A through 3C identify a plurality of text strings that can be used to indicate portions of a location identification grid 100 corresponding to a location. Referring now to FIG. 3A, FIG. 3A depicts a first text string 302. A text string can comprise a collection of text. As depicted in FIG. 3A, the first text string 302 comprises a plurality of first characters 304. These first characters 304 can comprise a letter, a number, or any other symbol.

In some embodiments, the first characters 304 within the first text string 302 can correspond to, or identify, the position of a location within the location identification grid 100.

In some embodiments, the first text string 302 can be used to identify a location. In some embodiments, the first text string 302 can include a desired number of first characters 304 to provide a desired resolution and/or accuracy level in identifying a location. In some embodiments, one or several of the first characters 304 of the first text string 302 can be associated with a first geographic area 104 and with one or several second geographic areas. In some embodiments, one or several of the first characters 304 of the first text string 302 can be associated with an entity, a person, a property, an address, and/or any other desired item. In some embodiments, the item, including, for example, the entity and/or person, associated with some of the first characters 304 of the first text string 302 can be associated with the location identified by the remaining portions of the first text string 302. Thus, a first portion of the first characters 304 of the first text string 302 can identify a location, and a second portion of the first characters 304 of the first text string 302 can be associated with, for example, an entity, a person, a property, or an address. Advantageously, this can facilitate, delivery of an item to a person at a location by allowing the identification of the recipient by reference to the text string and/or information associated with the text string.

In some embodiments, in which the first text string 302 is associated with an item such as, for example, a property, an entity, and/or a person, the first text string 302 can be used as an address, as a telephone number, as an email address, or for any other desired purpose. Advantageously, in some embodiments, the first text string 302 can be converted into a signal, a computer readable code, and/or any other desired format to facilitate its use.

Referring to location 150, location 150 can be identified with the first text string 302 of first characters 304 by "153," as discussed above. This text string identifies a unique first geographic area 104 containing the location 150, and the portion of the unique first geographic area 104, namely the unique second geographic area of a first size 108*a*, containing the location.

In some embodiments in which further accuracy is desired, the portion of the second geographic area of a first size 108*a* containing the location 150, namely, the unique second geographic area of a second size 200*a*, can be identified. Thus, in some embodiments, information may be requested relating to the location of something covering a large area or information may be requested relating to the location of something covering a small area. In the case in which information relating to the location of something covering a large area is requested, a lesser degree of accuracy is required in identifying the location that in the case in which information relating to the location of something covering a small area is requested.

In some embodiments, the first text string 302 providing this level of accuracy can comprise, for example, "15345." Similarly, additional first characters 304 can be added to the first text string 302 to provide additional accuracy to the identification of location 150.

FIG. 3B depicts another embodiment of a text string. Specifically, FIG. 3B depicts a second text string 306. As discussed above, the second text string 306 can have any desired length, and can comprise any desired number of text characters. As depicted in FIG. 3B, the second text string 306 can comprise one or several first characters 304 located within a first string portion 308, and one or several second characters 310 located in the second string portion 312. Like the first characters 304, the second characters 310 can comprise a letter, a number, or any other symbol.

In some embodiments, the first string portion 308 can correspond to and identify a first geographic area 104. In some embodiments, the second string portion 312 can identify and correspond to one or several second geographic areas located within the identified first geographic area 104.

In some embodiments, in which the second geographic areas are created by one or several first boundary lines that are parallel, and one or several second parallel boundary lines, and in which the first boundary lines and the second boundary lines are perpendicular to each other, the second string portion 312 can be divided into character pairs. Specifically referring to FIG. 3B, the second string portion 312 includes the character pair 310*a* and 310*b*. In some embodiments in which the second geographic areas are created by intersecting and perpendicular first boundary lines and second boundary lines, the character pair 310*a* and 310*b* can designate a second geographic area similar to coordinate pair. Specifically, a first portion of the character pair 310*a* can identify a portion of the first geographic area 104 divided by the first boundary lines and the second portion of the character pair 310*b* can identify a portion of the geographic area divided by second boundary lines. Thus, by specifying both the first portion 310*a* and the second portion 310*b*, a portion of the larger geographic area can be specified.

In some embodiments of the second text string 306 in which the second string portion 312 includes more than two second characters 310, these additional characters can further specify portions of a larger geographic area. Thus, the first pair 310*a* and 310*b* may specify the portion of the first geographic area in which the location is found. Similarly, the next pair of identifiers 310*c* and 310*d* can identify the portion of the first geographic area defined by 310*a* and 310*b* in which the location is found. Likewise, the pair including 310*e* and 310*f* can define the portion of the geographic area defined by 310*c* and 310*d* in which the location is found. Thus, by extending the second string portion to include more character pairs, a location can be increasingly more accurately identified.

In some embodiments, the second text string 306 can be used to identify a location. In some embodiments, the second text string 306 can include a desired number of first characters 304 and/or second characters 310 to provide a desired resolution and/or accuracy level in identifying a location. Similar to the first text string 302, in some embodiments, one or several of the first characters 304 and/or second characters 310 of the second text string 306 can be associated with an entity, a person, a property, and address, and/or any other desired item.

In some embodiments, in which the second text string 306 is associated with an item such as, for example, a property, an entity, and/or a person, the second text string 306 can be used as an address, as a telephone number, as an email address, or for any other desired purpose. Advantageously, in some embodiments, the second text string 306 can be converted into a signal, a computer readable code, and/or any other desired format to facilitate its use.

FIG. 3C identifies a third text string 314. Like the second text string 306 identified in FIG. 3B, the third text string 314 includes a first character 304 in a first string portion 308 and a second character 310 in the second string portion 312. As depicted in FIG. 3C, the third text string 314 additionally includes a third character 316 in a third string portion 318. In some embodiments, for example, the third character 316 found in the third string portion 318 can comprise a character indicating a division between the first string portion 308 and the second string portion 312. Thus, in some embodiments, third characters 316 found in the third string portion 318 do not identify a location, but assist in separating the first string portion 308 from the second string portion 312.

In some embodiments, the third text string 314 can be used to identify a location. In some embodiments, the third text string 314 can include a desired number of first characters 304 and/or second characters 310 to provide a desired resolution and/or accuracy level in identifying a location. Similar to the first text string 302, in some embodiments, one or several of the first characters 304 and/or second characters 310 of the third text string 314 can be associated with, for example, an entity, a person, a property, an address, and/or any other desired thing. In some embodiments, the thing, including, for example, the entity and/or person, associated with some of the first characters 304 and/or the second characters 310 of the third text string 314 can be associated with the location identified by the remaining portions of the third text string 314.

In some embodiments, in which the third text string 314 is associated with a thing such as, for example, a property, an entity, and/or a person, the third text string 314 can be used as an address, as a telephone number, as an email address, or for any other desired purpose. Advantageously, in some embodiments, the third text string 314 can be converted into a signal, a computer readable code, and/or any other desired format to facilitate its use.

Referring again to location 150, location 150 can be identified with the third text string 314 of first characters 304, second characters 310, and third characters 316 by "1##53." In this embodiments the "1" can correspond to the first characters 304, "53" can correspond to the second characters 310, and the "##" can correspond to the third characters 316. This text string identifies a unique first geographic area 104 containing the location 150, and the portion of the unique first geographic area 104, namely the unique second geographic area of a first size 108a, which contains the location.

In some embodiments in which further accuracy is desired, the portion of the second geographic area of a first size 108a containing the location 150, namely, the unique second geographic area of a second size 200a, can be identified. In some embodiments, the third text string 314 providing this level of accuracy can comprise, for example, "1##5345." In this embodiments, the "1" can correspond to the first characters 304, "5345" can correspond to the second characters 310, and the "##" can correspond to the third characters 316. Similarly, additional first characters 304 can be added to the first text string 302 to provide additional accuracy to the identification of location 150.

A person of skill in the art will recognize that a variety of formats can be used to identify a location within a location identification grid 100. A person of skill in the art will further recognize that the present disclosure is not limited to any specific format of information identifying a location within a location identification grid 100.

Figure 4:
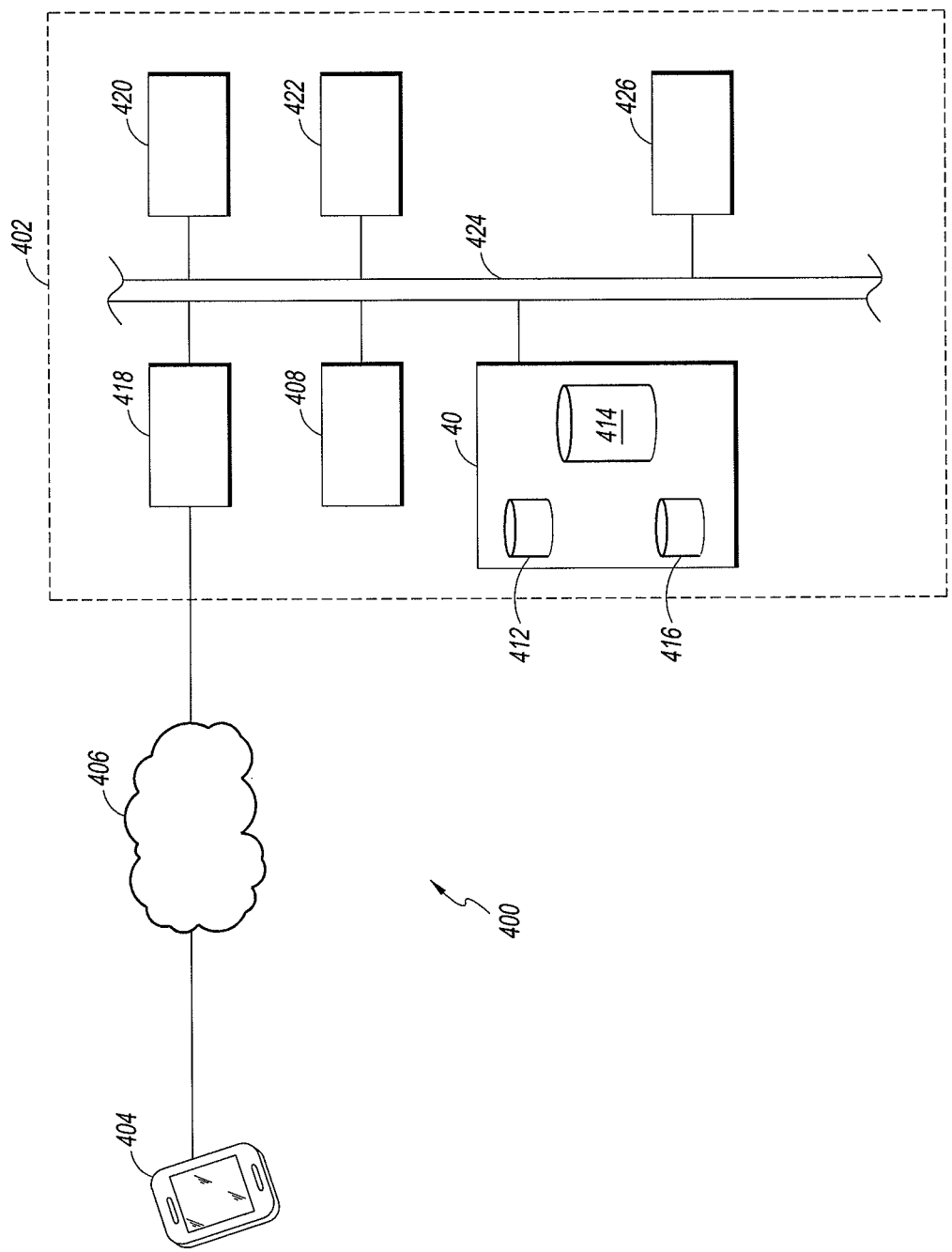
FIG. 4 is a block diagram of one embodiment of a system that can be used in connection with the location identification grid.

FIG. 4 depicts a block diagram of one embodiment of a system configured for use with the location identification grid 100. The system 400 can comprise a variety of features configured to perform a variety of functions. In some embodiments, the features and components of the system 400 can be independent, can be communicatingly linked, can be controllably linked, or can be linked in any other desired fashion.

In some embodiments, the system 400 can comprise a central processing system 402. In some embodiments, the central processing system 402 can be configured to control the generation of a location identification grid 100 and the use of the location identification grid 100. In some embodiments, the grid system 400 can be in communicating connection with a user device 404 such as a mobile handset that can include a user communication interface such as a keyboard, speaker for communicating audible sounds, or a display for showing visual information. In some embodiments, the user communication interface can be configured to receive inputs from the user and to provide outputs to the user.

The user device 404 can be remote from the central processing system 402, integral in the central processing system 402, or proximate to the central processing system 402. In some embodiments, the user device 404 can be configured to allow a user to provide inputs and information to the central processing system 402 and to receive outputs and information from the central processing system 402. The user device 404 can comprise any device capable of allowing a user to communicate with the central processing system 402. In some embodiments, the user device 404 can comprise, for example, a device comprising a processor, such as a personal computer, a laptop computer, a smart phone, a cell phone, a tablet, or any other similar device. While FIG. 4 depicts a user device 404 separate from the central processing system 402, in some embodiments, some or all of the features, modules, and/or components of the central processing system 402 can be integrated into the user device 404.

In some embodiments, the user device 404 can include features and/or components configured to determine the location of the user device 404. In some embodiments, the features and/or components can comprise features configured to communicate with a location system and/or component such as, for example, a satellite based location system, a cellular network location identification system, and/or any other system or component capable of providing information relating to the location of the user device 404. Advantageously, information relating to the location of the user device 404 can be used in connection with a location request to determine a path and/or directions to the location identified by the location request.

As depicted in FIG. 4, in some embodiments, the user device 404 can be configured to communicate with the central processing system 402 via communication system or network 406. The communication system or network 406 can be configured to communicate signals and can comprise, for example, a local area network, a wide area network (WAN), the internet, a cell phone network, a telecommunications network, WiFi, or any other communication system.

The central processing system 402 can comprise a variety of components and modules capable of performing a variety of functions. The central processing system 402 can be configured to receive inputs from components of the system 400 that are not included in the central processing system 402, to provide information to these components, and to perform various tasks with the information received from the components of the system 400.

In some embodiments, the central processing system 402 can comprise, for example, a communication feature 424 connecting, a processor 408, a memory 410, a communications module 418, a security module 420, and an administrator module 422. In some embodiments, for example, the central processing system 402 can receive a location input from a user device 404. This location input can comprise, for example, a text string such as those discussed in reference to FIG. 3. The communication from the user device 404 can be received at the communication module 418 and communicated to the processor 408 via the communication feature 424. The processor 408 can operate in accordance with instructions received from the memory 410 and can, for example, use the location input to determine a location and to, for example, provide information relating to a position relative to that location and/or provide instruction to reach that location. In some embodiments, this determination of the location can include querying the security module 420 to determine whether the requested information can be provided to a user and/or to make any other security related determination.

In some embodiments, the components and modules of the central processing system 402 can be communicatingly connected via a communication feature 424. The communication feature 424 can comprise any feature capable of establishing a communication connection between the features and modules of the central processing system 402. These can include, for example, a wired or wireless device, a bus, a communications network, or any other suitable feature.

In some embodiments, the central processing system 402 can comprise, for example, a processor 408. A processor 408 may comprise a single processor, or may be a component of a processing system implemented with one or more processors. The one or more processors 408 may be implemented with any combination of general purpose microprocessors, microcontrollers, digital signal processors (DSPs), field programmable gate array (FPGAs), programmable logic devices (PLDs), controllers, state machines, gated logic, discrete hardware components, dedicated hardware, finite state machines, or any other suitable entities that can perform calculations or other manipulations of information. The processor 408 can comprise, for example, a microprocessor such as an ARM processor, a Pentium® processor, a Pentium® proprocessor, an 8051 processor, an MIPS® processor, a Power PC®, an Alpha® processor, or the like. The processor 408 typically has conventional address lines, conventional data lines, and one or more conventional control lines.

The processor 408 can be in communicating connection with a memory 410. The memory 410, can be configured to store a wide range of information using any of a wide range of techniques. The features and functions of the memory are discussed in greater detail below.

In some embodiments, the processor 408 can perform processes in accordance with instructions stored in the memory 410. These processes can include, for example, controlling features and/or components of the central processing system 402, requesting and/or receiving information from features and/or components of the system 400, transmitting instructions and/or control signals to features and/or components of the central processing system 402, requesting information from an administrator, transmitting information to the administrator, processing information received from features and/or components of the central processing system 402, processing information received from features and/or components of the system 400, processing information received from the administrator, and/or any other desired processes.

In some embodiments, the memory 410 can comprise one or several databases. The databases can comprise an organized collection of digital data. The data stored in the databases can comprise any desired data, and can, in some embodiments, relate to functions of the central processing system 402 and/or the system 400.

In some embodiments, and as depicted in FIG. 4, the memory 410 comprises a plurality of databases and specifically provides a grid database 412, and a user database 414. In some embodiments, the grid database 412 can comprise information relating to the location identification grid 100. This information can include, for example, data relating to the geographic region 102, data relating to the first geographic area 104, data relating to the second geographic area of a first size 108, data relating to any of the second geographic areas, data relating to the contents of the geographic region 102, the first geographic area 104, or any of the second geographic areas, or any other desired information. In some embodiments, this data can define the boundaries of at least one geographic area, such as, for example, first geographic area 104a.

In some embodiments, the grid database 412 can comprise location information preassociated with the location identification grid 100. Thus, in some embodiments, information relating to a specific location can be associated with, for example, one or more geographic regions 102, one or more geographic areas 104, or one or more second geographic areas. In some embodiments, the preassociation of location data with the different aspects of the location identification grid 100 can facilitate quicker access to the location information.

In some embodiments, the user database 414 can comprise information relating to the user and/or the user account. In some embodiments, this information can include, for example, account information such as an account number, a user name, a password, or any other account identification and/or verification information. In some embodiments, the user database 414 can comprise information relating to the account status including, for example, account usage, account payments due, account payments pending, account payments received, and/or any other payment issues.

In some embodiments, the user database can include information relating to the amount of information that can be provided to a user. In some embodiments, the amount of information provided to a user is referred to as, for example, a user's access level. In some embodiments, these access levels can comprise authorization for a user to access defined portions of the location identification grid. Thus, in some embodiments, a user may not have access to all of the information stored within a location identification grid. These limitations may be based on, for example, concerns such as security, national security, privacy, or the type of information plan for which the user is subscribed.

In some embodiments, a user may have access to only a certain level of specificity as to a particular location. Thus, in some embodiments, this specificity, or resolution, may be limited by a user's access level to, for example, specificity within 100 meters, within 10 meters, within 1 meter, or any other desired specificity. Thus, in some embodiments, the user database 414 may include an indicator of the limit of resolution that a user can receive.

A person of skill in the art will recognize that the user database 414 can comprise more or less information than that outlined above, and that the user database 414 is not limited to the specific features and components discussed herein.

In some embodiments, the central processing system 402 can comprise a communications module 418. In some embodiments, for example, the communications module 418 can be communicatingly connected to the processor 408. In some embodiments, for example, the communications module 418 can be configured to communicate with other modules and components of the system 400, such as, for example, the user device 404. In some embodiments, the communications module 418 can be configured for wired or wireless communications, and can be configured to request information and receive inputs from the user device 404, and/or components or modules of the central processing system 402. The central processing system 402 can, in some embodiments, comprise a plurality of modules, which modules can be embodied in hardware or software, and which can comprise a single piece of hardware or software or systems of hardware or software.

In some embodiments, the modules of the central processing system 402 can be configured to receive or generate input for the central processing system 402. In one embodiment, and as depicted in FIG. 4, the central processing system 402 can comprise a plurality of modules, and can specifically comprise a security module 420 and an administrator module 422.

The security module 420 can, for example, comprise features and components configured to detect and prevent prohibited access to the central processing system 402. In some embodiments, for example, the security module 420 can prevent an unauthorized user from gaining access to information related to secure areas or areas for which information is not provided in their user plan. In some embodiments, for example, the security module 420 can prevent a user from getting a higher degree of resolution than provided by their user plan.

In some embodiments, the security module 420 can provide security benefits to a user. Specifically, in one embodiment, the security module 420 can be configured to protect improper usage of a user account. In such an embodiment, the security module 420 can be configured to detect fraudulent account access and/or access attempts. In some embodiments, the security module 420 can be configured to protect the central processing system 402. In such an embodiment, the security module 420 can be configured to detect malicious software, attempts to penetrate unauthorized areas of the central processing system 402, or any other potential security breach.

A person of skill in the art will recognize the security module 420 can comprise a variety of features and perform a variety of functions, and the security module 420 is not limited to the above enumerated features and functions.

In some embodiments, the administrator module 422 can comprise an administrator access point. In some embodiments, the administrator access point can comprise any device, software, or feature capable of requesting and receiving information from the central processing system 402 and providing inputs to the central processing system 402. In some embodiments, the administrator access point can comprise a terminal and/or access portal. In some embodiments, for example, the administrator terminal can comprise any device capable of allowing an administrator to communicate with the central processing system 402. The administrator terminal can comprise, for example, a device comprising a processor such as, a personal computer, a laptop computer, smartphone, cell phone, tablet, or any other device including a processor. In some embodiments, the access portal can comprise a web portal, or any other software configured to allow an administrator to access information from the central processing system 402.

A person of skill in the art will recognize that the system 400 and the central processing system 402 can comprise more or fewer features, components, and/or modules than those outlined above, and can be capable of performing more or fewer functions than those outlined above.

Creation and Use of a Location Identification Grid

Figure 5:
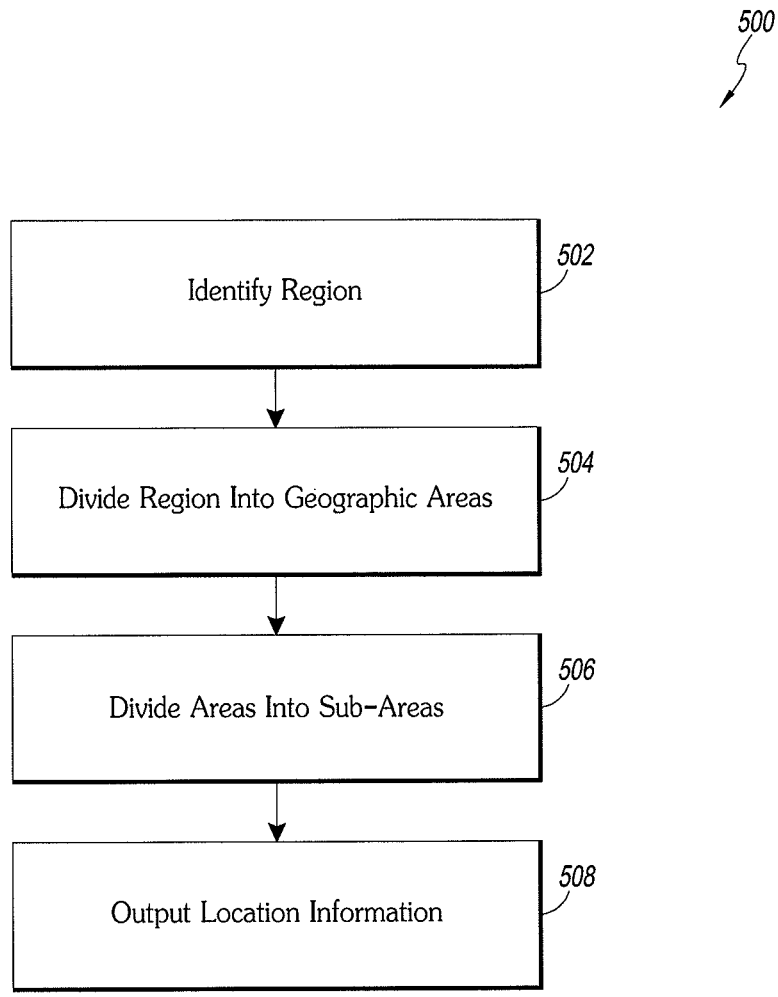
FIG. 5 is a flow chart illustrating one embodiment of a process for creating a location identification grid.

The system 400 and the central processing system 402 can be used to create and use a location identification grid 100. FIG. 5 is a flowchart illustrating one embodiment of the process 500 for making a location identification grid 100. In some embodiments, for example, the process 500 is performed by the central processing system 402. The process 500 begins at block 502 wherein a region is identified by the central processing system 402. In some embodiments, the identification of the region can comprise receiving an input indicating a region for creating a location identification grid 100. In some embodiments, this input indicating a region creating a location identification grid 100 can be received from the user. In some embodiments, for example, the identified region can comprise a geographic region 102. In some embodiments, the central processing system 402 can identify the region by querying a database with location information and determining the region corresponding to the location.

After the region has been identified in block 502, the process 500 then proceeds to block 504 where the region is divided into areas. In some embodiments, the region can be divided into, for example, one or several first geographic areas 104, or one or several second geographic areas. In some embodiments, for example, the central processing system 402 and/or the processor 408 can divide the region into areas. In some embodiments, the division of the region into areas can correspond to the creation of areas making up the region. In some embodiments, the division of the region into areas can correspond to the identification of pre-existing areas that divide up the region. In some embodiments, the pre-existing areas can be already established areas that divide the region. In some embodiments in which pre-existing areas are used to divide up the region, the suitability of the pre-existing areas can be determined before dividing the region up into the areas. In some embodiments, the suitability of the pre-existing regions can be determined by determining whether the pre-existing regions fall within certain criteria such as, for example, size criteria, shape criteria, or any other desired criteria.

In some embodiments, a pre-existing area may be associated and/or identified with a pre-existing identifier. Thus, for example, an area defined by a postal code such as a zip-code can be a pre-existing area, and the postal code such as the zip-code is the pre-existing identifier for the area defined by the postal code such as the zip-code.

After the region is divided into areas in block 504, the process 500 moves to block 506 where the areas are divided into a plurality of subareas. In some embodiments, for example, the division of areas into a plurality of subareas can correspond to the division of one or several first geographic areas 104 into second geographic areas. In some specific embodiments, the division of areas into a plurality of subareas can correspond to dividing one or several first geographic areas 104 into a plurality of second geographic areas of a first size 108. In some embodiments, for example, the division of areas into a plurality of subareas can be performed by the central processing system 402.

In some embodiments, the division of one or several first geographic areas 104 can be achieved by the application of a pre-existing grid system to the first geographic areas 104, such as, for example, the national grid.

After the areas are divided into a plurality of subareas, the process 500 moves to block 508 and location information is output. In some embodiments, the location information can be output to a user. For example, in some embodiments, the location information can be output from the grid system to a user device 404. In some embodiments, this output can include the communication between the central processing system 402 and the user device 404 via the communication system and network 406. In some embodiments, information can be output from the central processing system 402 to the communication system and network 406 via a communications module 418 of the central processing system 402.

A person of skill in the art will recognize that the process 500 can include more or fewer steps than those outlined above. A person of skill in the art will further recognize than the above-outlined steps of process 500 can be performed in any desired order, and can include substeps or subprocesses.

Figure 5A:
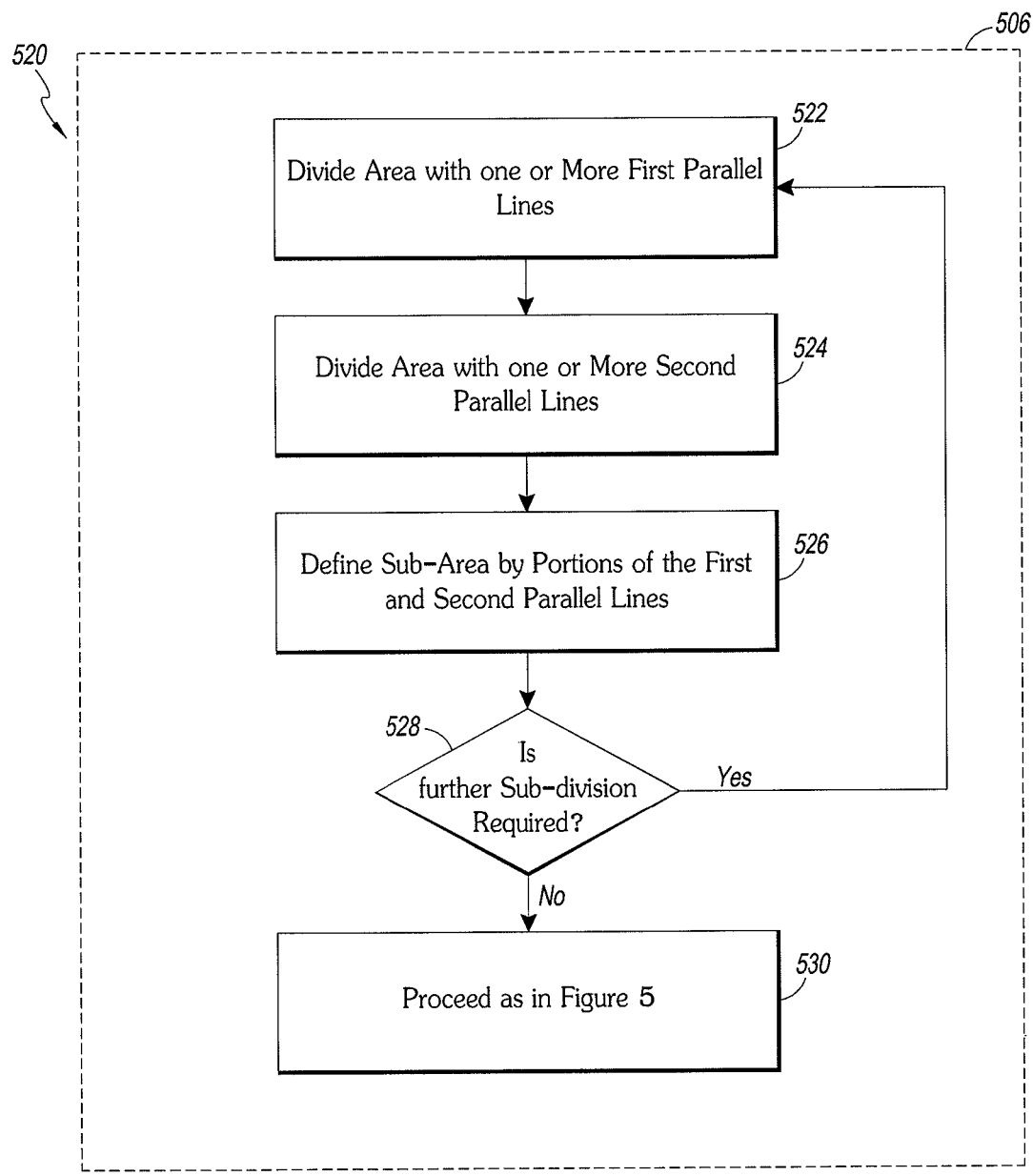
FIG. 5A is a flow chart illustrating one embodiment of a process for dividing areas into sub-areas.
Figure 5B:
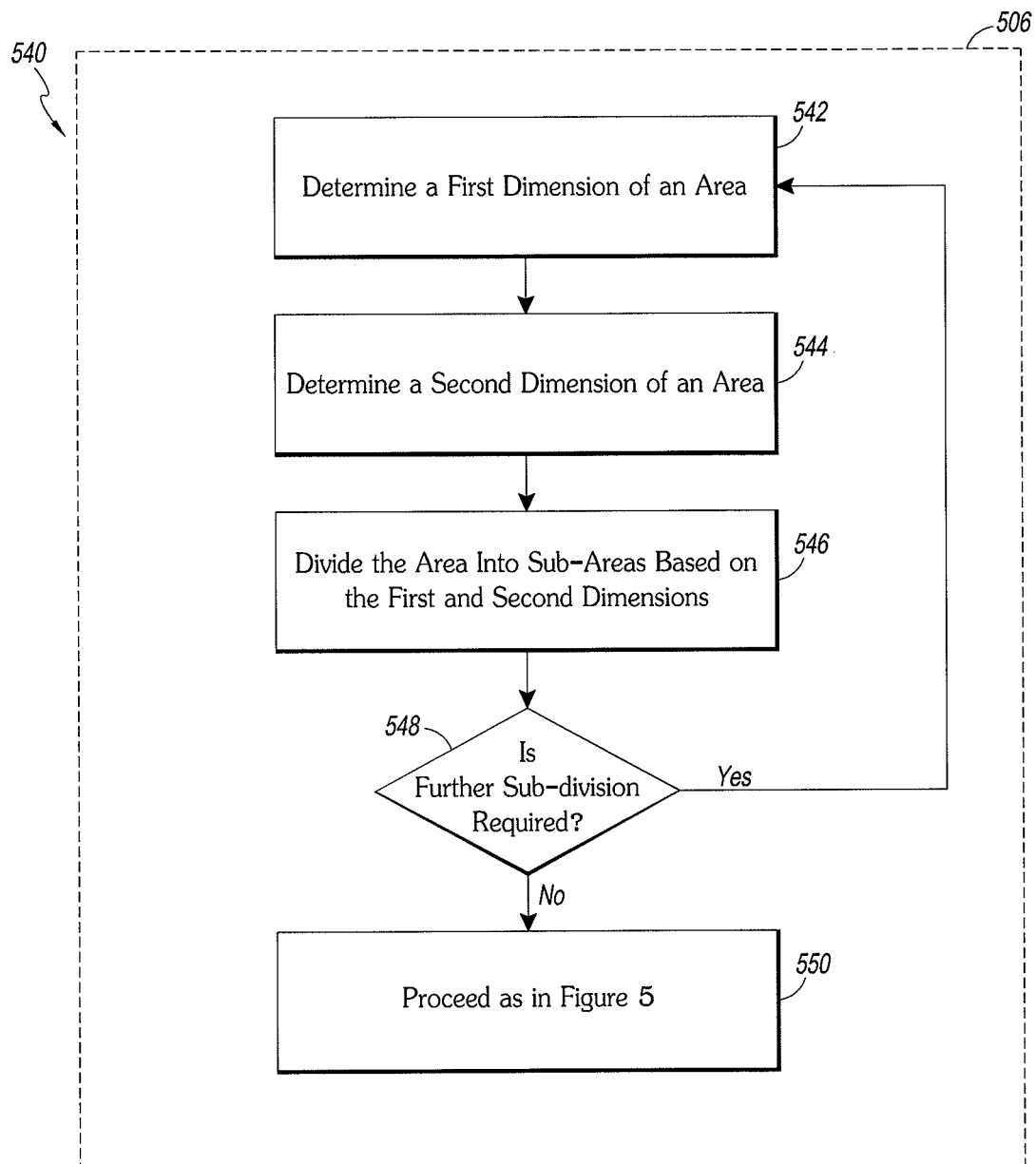
FIG. 5B is a flow chart illustrating a second embodiment of a process for dividing areas into sub-areas.

FIGS. 5A and 5B depict one embodiment of subprocesses performed in block 506 of FIG. 5. In particular, FIG. 5A depicts one embodiment of a process 520 for dividing areas into a plurality of sub-areas as indicated in block 506 of FIG. 5. In some embodiments, the process 520 can be performed by the central processing system 402. Thus, in some embodiments in which information relating to a preexisting location identification grid 100 is being accessed, the process 520 can include querying the memory 410 for information relating to the preexisting location identification grid 100.

Having this information from block 504 of FIG. 5, the process 520 moves to block 522 and the area is divided with one or more first parallel lines. In some embodiments, this division is performed by the central processing system 402 and/or components of the central processing system 402. In such an embodiment, the processor 408 can be configured to query the memory 410 for information relating to the generation of first parallel lines. In some embodiments, this information can include, for example, the spacing between the first parallel lines, the number of first parallel, including, for example, a maximum and/or minimum number of first parallel lines, and or any other desired information. These first parallel lines are then generated and used to divide the area.

Some embodiments can include a wide range of first parallel lines. In some embodiments, the number of first parallel lines can be determined based on the desired size of the resulting areas created by the first parallel lines. In some embodiments, a single first parallel line may be used to divide the area. In some embodiments, for example, a plurality of first parallel lines can be used to divide the area. In some embodiments, for example, the number of first parallel lines used to divide the area can be 100, 50, 25, 10, 9, 8, 7, 6, 5, 4, 3, 2, 1, or any other or intermediate number of first parallel lines. In some embodiments, for example, the use of a number of first parallel lines less than 10 can allow the use of a single second character 310 to indicate a specific divided subarea of the area. Advantageously, the ability to specify a certain divided subarea of the area with a single second character 310 can facilitate the construction of the text string for use in identifying a location.

A person of skill in the art will recognize that a wide range of techniques can be used to divide the area with one or more first parallel lines and for generating the one or more first parallel lines, and that the present disclosure is not limited to any specific embodiments thereof.

After the area is divided with one or more first parallel lines in block 522, the process 520 moves to block 524 wherein the area is divided with one or more second parallel lines. In some embodiments, this division is performed by the central processing system 402. In such an embodiment, the processor 408 can be configured to query the memory 410 and input information for parameters with which to generate the second parallel lines. In some embodiments, this information can include, for example, the spacing between the second parallel lines, the number of second parallel, including, for example, a maximum and/or minimum number of second parallel lines, and or any other desired information. These second parallel lines can then be generated and used to divide the area. As discussed above, in some embodiments, the first and second parallel lines can correspond to pre-existing lines, such as those associated with, for example, the national grid.

Some embodiments can include a wide range of numbers of second parallel lines. In some embodiments, the number of second parallel lines can be determined based on the desired size of the resulting areas created by the second parallel lines. In some embodiments, a single second parallel line may be used to divide the area. In some embodiments, for example, a plurality of second parallel lines can be used to divide the area. In some embodiments, for example, the number of second parallel lines used to divide the area can be 100, 50, 25, 10, 9, 8, 7, 6, 5, 4, 3, 2, 1, or any other or intermediate number of second parallel lines. In some embodiments, for example, the use of a number of second parallel lines less than 10 can allow the use of a single second character 310 to indicate a specific divided subarea of the area. Advantageously, the ability to specify a certain divided subarea of the area with a single second character 310 can facilitate the construction of the text string for use in identifying a location.

A person of skill in the art will recognize that a wide range of techniques can be used to divide the area with one or more second parallel lines and for generating the one or more second parallel lines, and that the present disclosure is not limited to any specific embodiments thereof.

After the area is divided with one or more second parallel lines, the process 520 moves to block 526 and defines a sub-area using portions of the first and second parallel lines as boundaries. In some embodiments, this definition is performed by the central processing system 402. In such an embodiment, the processor 408 can be configured to query the memory and input information for parameters with which to define the sub-area or sub-areas.

The sub-areas can be bounded by portions of the first and second parallel lines. Specifically, in embodiments in which the first parallel lines are non-parallel with the second parallel lines, the intersection of the first parallel lines with the second parallel lines defines one or several subareas. In some embodiments, these subareas can comprise a variety of shapes, and in some embodiments in which the second parallel lines are perpendicular to the first parallel lines, the subareas can comprise a rectangular shape.

A person of skill in the art will recognize that the spacing between the first parallel lines and the second parallel lines, as well as the angle between the first parallel lines and the second parallel lines will determine the size and shape of the subareas created by the intersecting first parallel lines and second parallel lines.

After one or more subareas are defined by portions of the first and second parallel lines, the process 520 moves to decision state 528 where components of the central processing system 402 determine whether further subdivision is required. In some embodiments, the determination of whether further subdivision is require is based on whether an increased level of resolution is required to satisfactorily identify a location. Thus, in some embodiments in which a location must be very accurately identified, a higher level of resolution may be required and further subdivision may be required. In some embodiments, for example, the determination of whether further subdivision is required can be based on information received from the user. In some embodiments, this information can be received from the user at the time of input relating to a location, or in connection with the creation of a user account. In some embodiments, for example, the determination of whether further subdivision is required can be based on information stored in the user database 414 in the memory 410. In some embodiments, this information stored in the user database 414 can include, for example, information relating to the highest level of resolution that the user may access, or other similar information. In some embodiments, for example, the determination of whether further subdivision is required is based on the type of feature whose location is being identified. Thus, in some embodiments, the central processing system 402 can include features configured to determine the size of the requested location such as the size of a building whose location is being requested, the size of a geographic feature whose location is being requested, or any other similar information, and the resolution, and thus the determination of whether further subdivision is required, can be based in part on the size of the feature for whom the location is being requested.

If further subdivision is required, then the process 520 returns to block 522 and the division process is repeated. Returning again to block 528, if further subdivision is not required, then the process 520 proceeds to block 530 and the process 500 continues as described in FIG. 5.

FIG. 5B depicts another embodiment of a process 540 for performing the steps of block 506 of FIG. 5. Like the process 520 depicted in FIG. 5A, the process 540 depicted in FIG. 5B can be performed by the central processing system 402. In some embodiments, and as depicted in FIG. 5B, the process 540 begins at block 542 and the central processing system 402 determines a first dimension of an area. In some embodiments, the area for which a first dimension is being determined is a parent area that is to be divided into a plurality of child subareas.

In some embodiments, for example, information relating to the parent area can be retrieved from the memory 410, and this information can be used to determine a first dimension, or, for example, this information can include a first dimension. In some embodiments, the first dimension can be, for example, the maximum dimension in a first direction of the parent area.

A variety of techniques can be used to determine a maximum dimension in a direction of the area. These can include, for example, collecting measurement data relating to the dimension of the area in a single direction, and determining the largest value of the measurement data.

After a first dimension of the parent area is determined in block 542, the process 540 moves to block 544 and a second dimension of the area is determined. In some embodiments, the area for which a second dimension is being determined is a parent area that is being divided into a plurality of child subareas, and can be, for example, the same parent area for which a first dimension was determined.

In some embodiments, for example, information relating to the parent area can be retrieved from the memory 410, and this information can be used to determine a second dimension, or, for example, this information can include a second dimension. In some embodiments, the second dimension can be, for example, the maximum dimension in a second direction of the parent area.

After a second dimension of the parent area is determined, the process 540 moves to block 546 and the parent area is divided into subareas based on the first and second dimensions. In some embodiments, the parent area can be divided into child areas and/or child subareas based on the first and second dimensions by determining a desired size of the subareas. In some embodiments, for example, the first dimension of the area can be divided by the desired size of the subareas to determine the number of divisions of the area to be made in the direction of the first dimension. Similarly, in some embodiments in which the size of the subareas is known, the value of the second dimension can be divided by the desired size of the subareas to determine the number of divisions to be made of the area in the direction of the second dimension.

Having determined the number of divisions to be made in the direction of the first dimension and in the direction of the second dimension, in some embodiments, for example, a group of first parallel lines and a group of second parallel lines can be generated to divide the area into subareas.

A variety of techniques can be used to divide the area into a number of subareas. Further these techniques are not limited to the above disclosures, but include, for example, any number of techniques capable of dividing an area into a number of subareas.

After the area is divided into a plurality of subareas based on the first and second dimensions, the process 540 moves to decision state 548 and the central processing system 402 determines if further subdivision is required. In some embodiments, the determination of whether further subdivision is require is based on whether an increased level of resolution is required to satisfactorily identify a location. Thus, in some embodiments in which a location must be very accurately identified, a higher level of resolution may be required and further subdivision may be required. In some embodiments, for example, the determination of whether further subdivision is required can be based on information received from the user. In some embodiments, this information can be received from the user at the time of input relating to a location, or in connection with the creation of a user account. In some embodiments, for example, the determination of whether further subdivision is required can be based on information stored in the user database 414 in the memory 410. In some embodiments, this information stored in the user database 414 can include, for example, information relating to the highest level of resolution that the user may access, or other similar information. In some embodiments, for example, the determination of whether further subdivision is required is based on the type of feature whose location is being identified. Thus, in some embodiments, the central processing system 402 can include features configured to determine the size of the requested location such as the size of a building whose location is being requested, the size of a geographic feature whose location is being requested, or any other similar information, and the resolution, and thus the determination of whether further subdivision is required, can be based in part on the size of the feature for whom the location is being requested.

If further subdivision is required, then the process 540 returns to block 542 and the division process is repeated. Returning again to block 548, if further subdivision is not required, then the process 540 proceeds to block 550 and the process 500 continues as described in FIG. 5.

Figure 6:
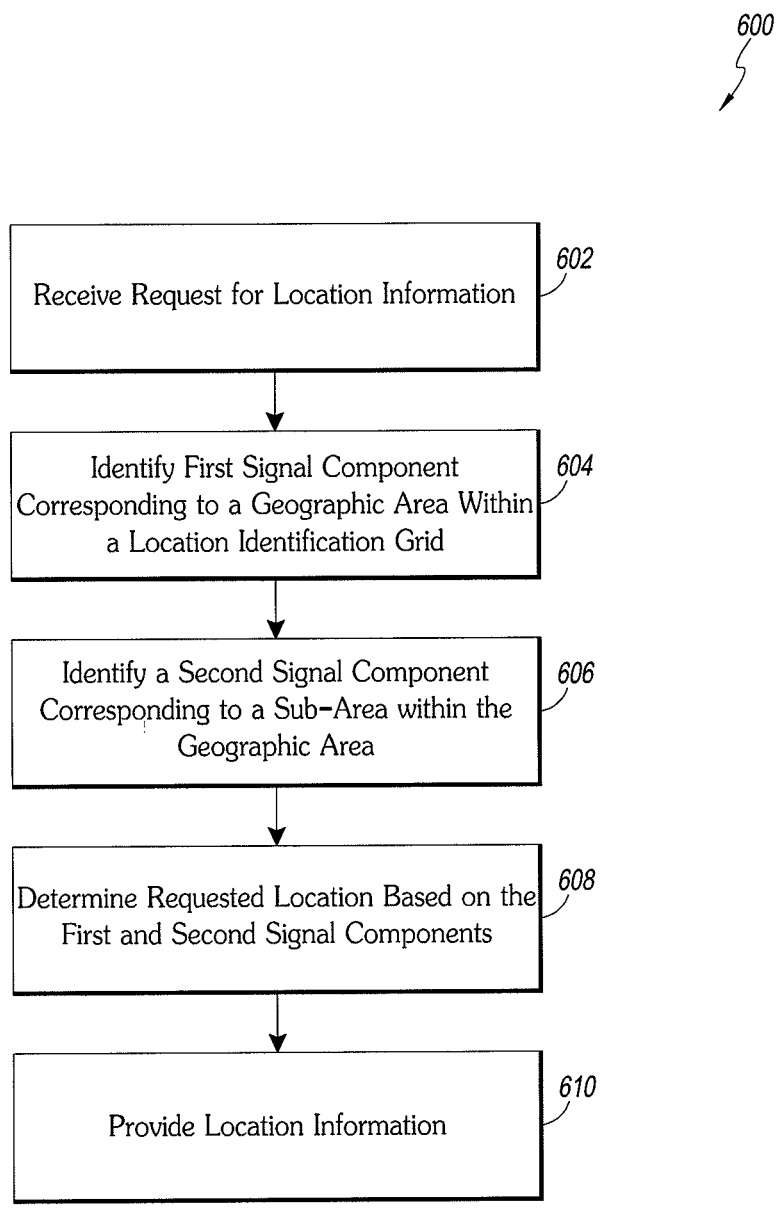
FIG. 6 is a flow chart illustrating one embodiment of a process for using a location identification grid to identify a location.

Some embodiments relate to methods of providing location information. In some such embodiments, the central processing system 402 can receive, for example, a request for location information and can, in response to the request, provide location information. FIG. 6 depicts one embodiment of a process 600 for providing location information. As depicted in FIG. 6, the process 600 begins at block 602 and a request for location information is received. In some embodiments, the request for location information can be provided by a system user, and in some embodiments, the request for location information can be provided by a third party, such as, for example, by a webpage. In some embodiments, this location information can correspond to a desired destination. In some embodiments, for example, the request for location information can be received by the central processing system 402 which can be a component of, or separate from the user device 404. Thus, in some embodiments in which the central processing system 402 is a component of the user device 404, the request for location information can be received in the form of a user input into the user device 404. Additionally, in some embodiments in which the central processing system 402 is separate from the user device 404, the request for location information can be received from the user device 404. In some embodiments, for example, the request for information is received at the communications module 418 of the central processing system 402.

After the request for location information is received at block 602, the process 600 moves to block 604 and a first signal component corresponding to and/or identifying a geographic area within a location identification grid is identified. A person of skill in the art will recognize that a variety of techniques can be used to identify the first signal component and the present disclosure is not limited to any specific technique for identifying the first signal component.

After the first signal component is identified from the received request for location information, the process 600 proceeds to block 606 and a second signal component corresponding to a subarea within the geographic area is identified from the received request for location information. For example, the identified sub area may be a smaller region within the larger area which includes the location identified in the received request. In some embodiments, for example, the signal can comprise indicators separating the first signal component from the second signal component. In some embodiments, the first signal component and the second signal component can be identified by use of these indicators within the signal.

After the second signal component corresponding to a subarea within the geographic area is identified, the process proceeds to block 608 and the requested location is determined based on the first and second signal components. In some embodiments, this determination can include, for example, querying the memory 410 for information relating to a preexisting location identification grid 100 and comparing the first and second signal components to information stored in the memory 410 relating to the pre-existing location identification grid 100.

In some embodiments, the determination of the requested location can further include, for example, the identification of the location of a second location that can be, for example, the location of the user device 404. This second location can be identified by a user input and/or can be made in connection with any feature, system, and/or component capable of determining the location of the user device 404. Information relating to the second location can be provided to the processor 408 which can, in connection with the memory 410 determine directions from the second location to the requested location. These directions can comprise, for example, a heading, a distance, a route along existing streets and/or paths, or any other desired form of directions. In some embodiments, the route along existing streets and/or paths can be selected based on the shortest distance between the requested location and the second location, based on the estimated time to move between the requested location and the second location, and/or any other parameter for route selection.

After the requested location is determined based on the first and second signal components, the process 600 moves to block 610 and location information is provided. In some embodiments, for example, in which the central processing system 402 is separate from the user device, the location information is provided from the central processing system 402 to the user device 404, and can be provided to the user device 404 via, for example, the communication system and network 406. In some in which the central processing system 402 is a component of the user device 404, the location information is provided from the user device 404 to the user. Thus, in some embodiments in which a route is determined between the requested location and the second location, the route can be provided to the user device 404 and/or to the user.

The process 600 depicted in FIG. 6 can include more or fewer steps than those depicted in FIG. 6, and the steps of process 600 depicted in FIG. 6 can be performed in the same or in a different order. Further, the steps of process 600 can include additional subprocesses and further steps.

Figure 6A:
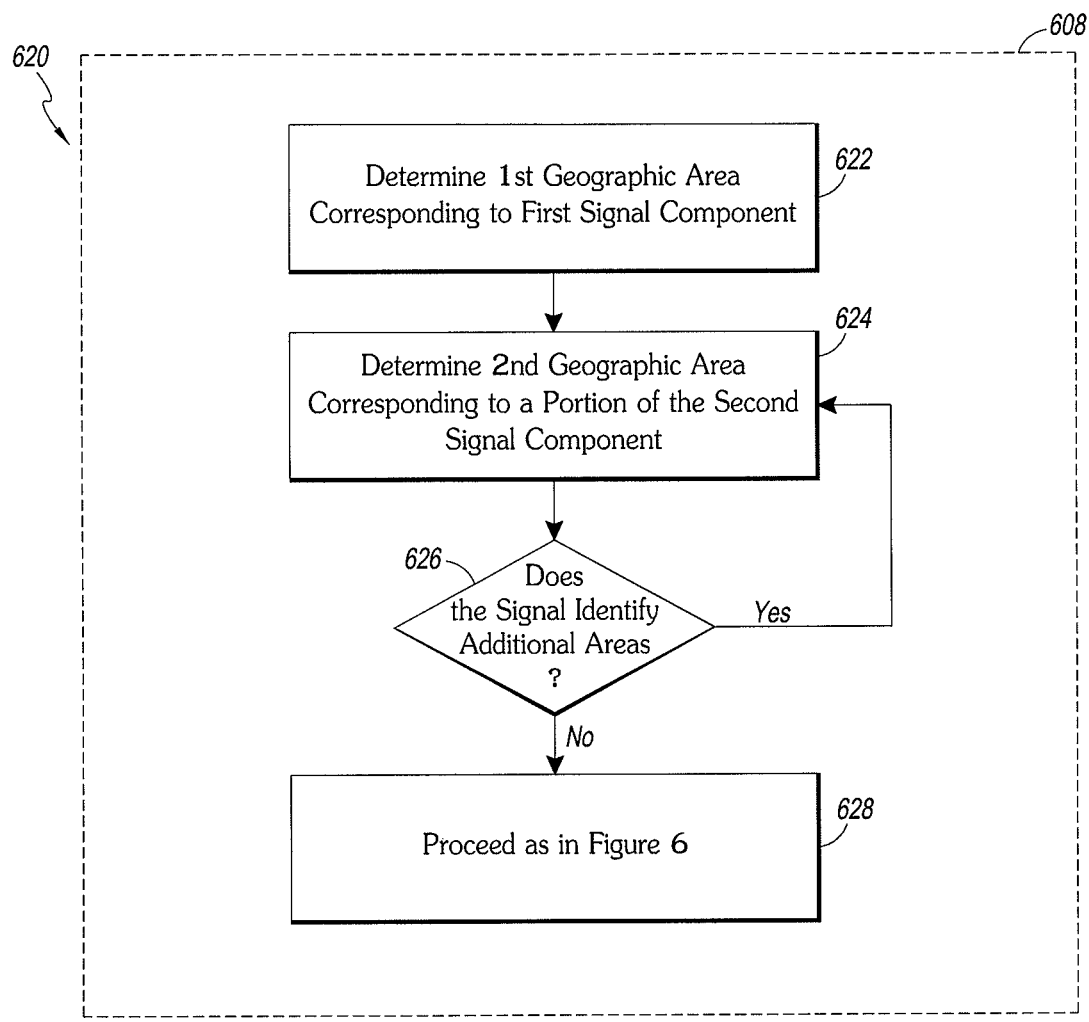
FIG. 6A is a flow chart illustrating one embodiment of a process for determining a requested location based on first and second signal components.

FIG. 6A depicts one embodiment of a subprocess 620 performed as a part of a step depicted in FIG. 6, and specifically as a subprocess of block 608 from FIG. 6. As depicted in FIG. 6A, the process 620 can be used to determine the requested location based on the first and second signal components.

The process 620 begins at block 622 and the first geographic area corresponding to a first signal component received in the received request for location information is determined. In some embodiments, the processor 408 can compare information received from the memory 410 with the first signal component. This comparison can be used to determine the first geographic area corresponding to the first signal component.

After the determination of the first geographic area corresponding to the first signal component, the process 620 proceeds to block 624 and a second geographic area corresponding to a portion of the second signal component received in the received request for location information is determined. In some embodiments, for example, information received from the memory 410 can be compared with the second signal component to determine the second geographic area corresponding to the second signal component. For example, the second signal component can comprise a text string identifying a second geographic area. Thus, the identification found in the text string of the second signal component can be used to identify the second geographic area.

After the second geographic area corresponding to a portion of the second signal component has been determined, the process 620 moves to decision state 626 and the central processing system 402 determines whether the from the received request for location information identifies additional areas. Referring to FIGS. 3A-3C, in some embodiments, a signal can include more information than identification of just the first geographic area and the second geographic area. In some embodiments, after the first geographic area corresponding to the first signal component has been determined and the second geographic area corresponding to a portion of the second signal component has been determined, the process determines whether the signal includes information identifying further geographic areas.

If the central processing system 402 determines that the signal identifies additional geographic areas, then the process 620 returns to block 624 and determines further second geographic areas corresponding to a portion of the second signal component.

Returning again to block 626, if the central processing system 402 determines that the signal does not identify additional areas then the process 620 moves to block 628 and proceeds to block 610 as depicted in FIG. 6.

The technology is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A microprocessor may be any conventional general purpose single- or multi-chip microprocessor such as an ARM processor, a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

A memory may comprise any device, feature, and/or component capable of storing information. In some embodiments, memory can comprise a hardware component and/or a software component. Memory can include, for example, RAM memory, flash memory, ROM memory, EPROM memory, EEPROM memory, registers, hard disk, removable disk, CDROM, or any other form of storage medium known in the art. Memory can store any desired information. In some embodiments, the information in memory can include, for example, software, at least one software module, instructions, steps of an algorithm, or any other information. In some embodiments, instructions in memory can direct a processor in performing processes in accordance with instructions stored in the memory. These processes can include, for example, controlling features and/or components physically associated and/or in communication with the processor, requesting and/or receiving information from features and/or components physically associated and/or in communication with the processor, transmitting instructions and/or control signals to features and/or components physically associated and/or in communication with the processor, processing information received from features and/or components physically associated and/or in communication with the processor, and/or any other desired processes.

The system may be used in connection with various operating systems such as Linux®, UNIX® or Microsoft Windows®.

The system control may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system control may also be written using interpreted languages such as Perl, Python or Ruby.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A method of directing a person to a location, the method comprising:
   receiving, at a processor, from an interface device, a request for location information of a desired destination, wherein the request comprises a location identifier having a first component and a second component, and a user identifier, wherein the first component of the identifier corresponds to a first geographic area and the second component of the identifier corresponds to a second geographic area, and wherein access to the first component requires a first level of authorization and access to the second component require a second level of authorization;
   querying, with the processor based on the first component of the location identifier, a memory to determine from a group of first irregularly shaped geographic areas a first irregularly shaped geographic area including the desired destination;
   querying, with the processor, based on the second component of the location identifier, the memory to determine from a group of second geographic areas covering the first irregularly shaped geographic area a second geographic area including the desired destination;
   determining, in an access module, an authorization level corresponding to the user identifier;
   determining a present location of the interface device; and
   providing an audible or visual output indicating a path from the present location of the interface device to the desired destination according to the authorization level corresponding to the user identifier.

2. The method of claim 1, wherein the first irregularly shaped geographic areas correspond to pre-existing geographic areas.

3. The method of claim 2, wherein the pre-existing geographic areas correspond to areas designated by one or several postal codes.

4. The method of claim 2, wherein the pre-existing geographic areas correspond to areas designated by one or several area codes.

5. The method of claim 1, wherein the second geographic areas correspond to pre-existing geographic areas.

6. The method of claim 5, wherein the pre-existing geographic areas are defined by a polar coordinate system.

7. The method of claim 5, wherein the pre-existing geographic areas are defined by a Cartesian grid system.

8. The method of claim 2, wherein receiving a request for location information comprises receiving a user input identifying a desired destination.

9. The method of claim 2, wherein receiving a request for location information comprises receiving a third party input identifying a desired destination.

10. The method of claim 9, wherein the third party input comprises receiving an input from a webpage.

11. The method of claim 2, wherein the path to reach the desired destination is partially on a road.

12. A system for directing a person to a location, the system comprising:
   means for receiving from an interface device, a request for location information of a desired location, wherein the request comprises a location identifier having a first component and a second component, and a user identifier, wherein the first component of the identifier corresponds to a first geographic area and the second component of the identifier corresponds to a second geographic area, and wherein access to the first component requires a first level of authorization and access to the second component require a second level of authorization;

means for querying, based on the first component of the location identifier, a memory to determine from a group of first irregularly shaped geographic areas a first irregularly shaped geographic area including the desired destination;

means for querying, based on the second component of the location identifier, the memory to determine from a group of second geographic areas covering the first irregularly shaped geographic area a second geographic area including the desired destination;

determining, in an access module, an authorization level corresponding to the user identifier;

means for determining a present location of the interface device; and means for providing an audible or visual output indicating a path from the present location of the interface device to the desired destination according to the authorization level corresponding to the user identifier.

13. The system of claim 12, wherein the plurality of first irregularly shaped geographic areas correspond to pre-existing areas.

14. The system of claim 13, wherein the pre-existing areas correspond to zip codes.

15. The system of claim 13, wherein the pre-existing areas correspond to area codes.

16. The system of claim 12, wherein the plurality of first parallel lines and the plurality of second parallel lines correspond to pre-existing grid lines.

17. The system of claim 12, wherein the plurality of second geographic areas correspond to pre-existing areas.

18. The system of claim 12, wherein the memory further comprises a unique identifier associated with one of the first irregularly shaped geographic areas.

19. The system of claim 12, wherein the system further comprises means for determining whether further resolution of the location identification is required.

20. The system of claim 19, wherein the system further comprises means to sub-divide the second geographic areas.

* * * * *